United States Patent [19]

Lacaze, Jr.

[11] 3,848,695

[45] Nov. 19, 1974

[54] APPARATUS FOR CONTROLLING AN INFLATABLE SAFETY DEVICE

[75] Inventor: Leonard Lacaze, Jr., Dearborn, Mich.

[73] Assignee: Ford Motor Company, Dearborn, Mich.

[22] Filed: Apr. 2, 1973

[21] Appl. No.: 347,266

[52] U.S. Cl. ......... 180/103, 280/150 AB, 340/52 H
[51] Int. Cl. ............................................. B60n 21/08
[58] Field of Search ........ 280/150 AB; 180/103, 91; 340/52 F, 52 H

[56] References Cited
UNITED STATES PATENTS

| | | | |
|---|---|---|---|
| 3,452,175 | 6/1969 | Wilkes | 200/153 R |
| 3,495,675 | 2/1970 | Hass | 280/150 AB |
| 3,547,467 | 12/1970 | Pociask | 280/150 AB |
| 3,629,816 | 12/1971 | Gillund | 180/103 |
| 3,633,159 | 1/1972 | Dillman | 180/91 |
| 3,663,035 | 5/1972 | Norton | 280/150 AB |
| 3,720,426 | 3/1973 | Johnston | 280/150 AB |
| 3,750,100 | 7/1973 | Ueda | 280/150 AB |
| 3,765,699 | 10/1973 | Marquardt | 280/150 AB |
| 3,768,831 | 10/1973 | Wesselman | 280/150 AB |
| 3,774,714 | 11/1973 | Usui | 280/150 AB |

Primary Examiner—David Schonberg
Assistant Examiner—John P. Silverstrim
Attorney, Agent, or Firm—Robert W. Brown; Keith L. Zerschling

[57] ABSTRACT

Apparatus for controlling an inflatable safety device for restraining an occupant of a motor vehicle during a crash. The preferred form includes electrically acuated means for causing the inflation of the inflatable safety device, first and second acceleration-responsive switches positioned on the vehicle's radiator or its support structure, a third acceleration-responsive switch positioned in the vehicle's passenger compartment, and a thermal cut-off device for disconnecting the inflation control apparatus from the vehicle's source of electrical energy if either of the first or second acceleration-responsive switches is closed for a predetermined length of time. The third switch is responsive to acceleration impulses of predetermined magnitudes and durations less than those to which the first and second switches are responsive. The thermal cut-off device includes a fusible element and has a resistance wire coiled around it to melt the fusible element. The acceleration-responsive switches are of the roller-band type.

7 Claims, 4 Drawing Figures

APPARATUS FOR CONTROLLING AN INFLATABLE SAFETY DEVICE

BACKGROUND OF THE INVENTION

This invention relates to vehicle safety apparatus and, more particularly, to apparatus for controlling the inflation of an inflatable safety device during a crash of the vehicle.

Various proposals have been made for the use of an inflatable safety device to protect occupants of the passenger compartment of a motor vehicle in the event of a crash. It has also been proposed that electrical means be provided for causing the inflation of the inflatable safety device.

Where the occupants of the front seat of the motor vehicle are to be protected by inflatable safety devices, one inflatable safety device may be located within the instrument panel of the vehicle and another in the central portion of the vehicle's steering wheel. Each inflatable safety device may be inflated with gas stored in a cylinder or the like or it may be inflated with gas produced by a gas generator, or both. If the inflation gas is stored in a cylinder, then an electrically actuated explosive squib or detonator is employed to blow out a plug or to open a valve in the storage container to release the gas into the inflatable safety device. If a gas generator is used, an electrically actuated ignitor squib may be used to ignite the gas generating material.

An inflatable safety device must be provided with apparatus for controlling its inflation so that it is deployed only during a severe vehicle crash, at the proper instant, and not otherwise. Typically, an electrical circuit is used for this purpose and one or more sensors are used to detect the occurrence of a crash of the vehicle. For example, U.S. Pat. No. 3,495,675, issued Feb. 17, 1970 to D. P. Hass et al, illustrates an inflatable safety device in the instrument panel of a motor vehicle and an electrical circuit for controlling its inflation. In this circuit, a crush sensing device is connected in series with an acceleration-responsive switch and with an explosive squib. Both the crush sensing device and the acceleration-responsive device must have their associated switch contacts closed in order to effect the actuation of the explosive squib. In U.S. Pat. No. 3,622,974, issued Nov. 23, 1971 to Frederick A. Best et al, a control circuit for actuating an inflatable air cushion in a motor vehicle is disclosed. The control circuit includes an electrically-fired actuator that is connected between a pair of SCRs which are triggered from vehicle deceleration sensors.

SUMMARY OF THE INVENTION

It is an object of the present invention to provide an improved apparatus for controlling the inflation of an inflatable safety device used to restrain a vehicle occupant during a crash of the vehicle.

Another object of the invention is to provide inflation-controlling apparatus capable of discriminating between high level and low level vehicle impacts.

A further object is to provide inflation-controlling apparatus capable of sensing both head-on vehicle crashes as well as crashes occurring at an angle with respect to the longitudinal centerline of the vehicle.

A further object is to provide inflation-controlling apparatus of a fail-safe character.

A still further object is to provide inflation-controlling apparatus including a plurality of crash detectors or sensors positioned and interconnected to cause inflation of an inflatable device upon a vehicle crash of predetermined energy level, to be nonresponsive to vehicle vibrations and acceleration impulses occurring during normal operation of the vehicle over both smooth and rough road surfaces, and to prevent inadvertent or accidental deployment of the inflatable safety device.

An additional object is to provide means for disconnecting the vehicle's source of electrical energy from the apparatus for controlling the inflation of an inflatable safety device in the event that an acceleration-responsive crash detector is in its acceleration-responsive condition for a predetermined length of time.

Apparatus for fulfilling these and other objects of the invention includes an electrically actuated means for causing the inflation of the inflatable safety device and first and second acceleration-responsive switches positioned forward of the passenger compartmant of the vehicle. The second acceleration-responsive switch is connected in parallel with the first switch, and these switches are connected in series with a third acceleration-responsive switch located in the vehicle's passenger compartment. The inflation of the inflatable safety device occurs upon the electrical actuation of the inflation causing means, this resulting from the simultaneous acceleration response of the first and third switches, of the second and third switches, or of all three of these switches.

In the preferred form of the invention, all three of the acceleration-responsive switches are of the roller-band type and include a conductive band and an electrical pole. The conductive band moves into contact with the electrical pole upon the occurrence of a predetermined acceleration acting upon the particular switch. The third acceleration-responsive switch located in the vehicle's passenger compartment is responsive to a predetermined acceleration acting upon it, less than that to which the first and second switches respond. The first and second acceleration-responsive switches are attached to the vehicle's radiator or its support structure and these switches are located, respectively, on opposite sides of the longitudinal centerline of the vehicle. Each of the first and second acceleration-responsive switches has a mounting switch connected in series with it to indicate that the acceleration-responsive switches are properly secured to the radiator or its support structure.

The mounting switch and series-connected acceleration-responsive switch positioned on one side of the longitudinal centerline of the vehicle is connected in parallel with the series-connected mounting switch and acceleration-responsive switch on the other side of the longitudinal centerline of the vehicle. This parallel-connected combination of switches is connected in series with the third acceleration-responsive switch located in the vehicle's passenger compartment.

A thermal cut-off switch having a fusible element with a coil of resistance wire around it is used to disconnect the source of electrical energy of the vehicle from the apparatus for controlling the inflation of the inflatable safety device upon the closure, for a predetermined length of time, of the switching elements in either of the first or second acceleration-responsive switches.

The phrase "radiator or its support structure" as used herein refers to a radiator positioned in a motor vehicle forward of its passenger compartment and to support structure for the attachment of the radiator to the frame or body structure of the vehicle.

The invention may be better understood by reference to the detailed description which follows and to the drawings.

DETAILED DESCRIPTION

Figure 1:
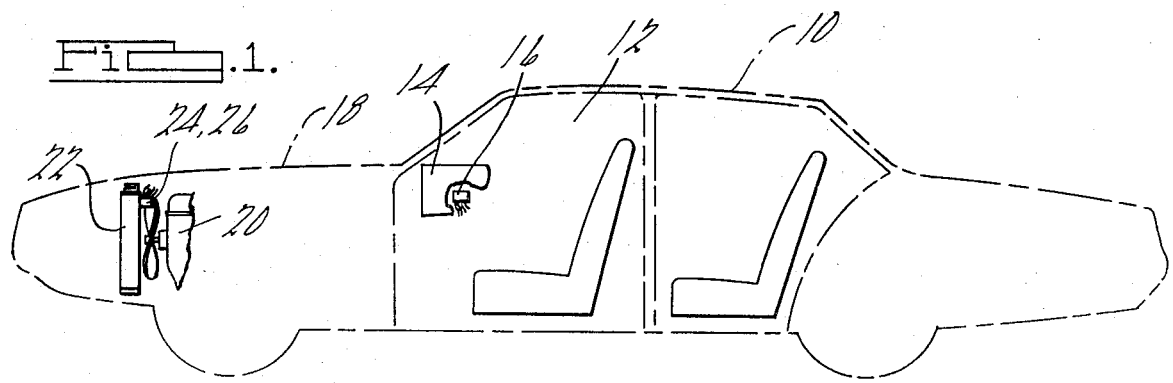
FIG. 1 is a schematic elevational view of a motor vehicle.

With reference now to the drawings, wherein like numerals refer to like parts in the several views, and in particular to FIG. 1, there is shown a schematic elevational view of a motor vehicle 10. The vehicle 10 has a passenger compartment 12 in which is located a suitable inflatable safety device (not shown) for restraining a vehicle occupant during a crash of the vehicle. The vehicle has an instrument panel 14 in which the inflatable safety device may be located. Located within or beneath the instrument panel 14 is a diagnostic circuit 16 and electrically actuated means for causing the inflation of the inflatable safety device, the latter not being shown in FIG. 1.

The front portion of the vehicle 10 is designated by the numeral 18. Located in this front portion, forward of the passenger compartment 12, is the vehicle's engine 20 and a radiator 22 located forward of the engine. The radiator 22 extends in the transverse direction of the vehicle 10. A pair of acceleration-responsive switches 24 and 26 are attached to the radiator 22 or its support structure in horizontal alignment with one another and on opposite sides of the longitudinal centerline of the vehicle 10. Preferably, the switches 24 and 26 are located above the horizontal centerline of the radiator 22.

Figure 2:
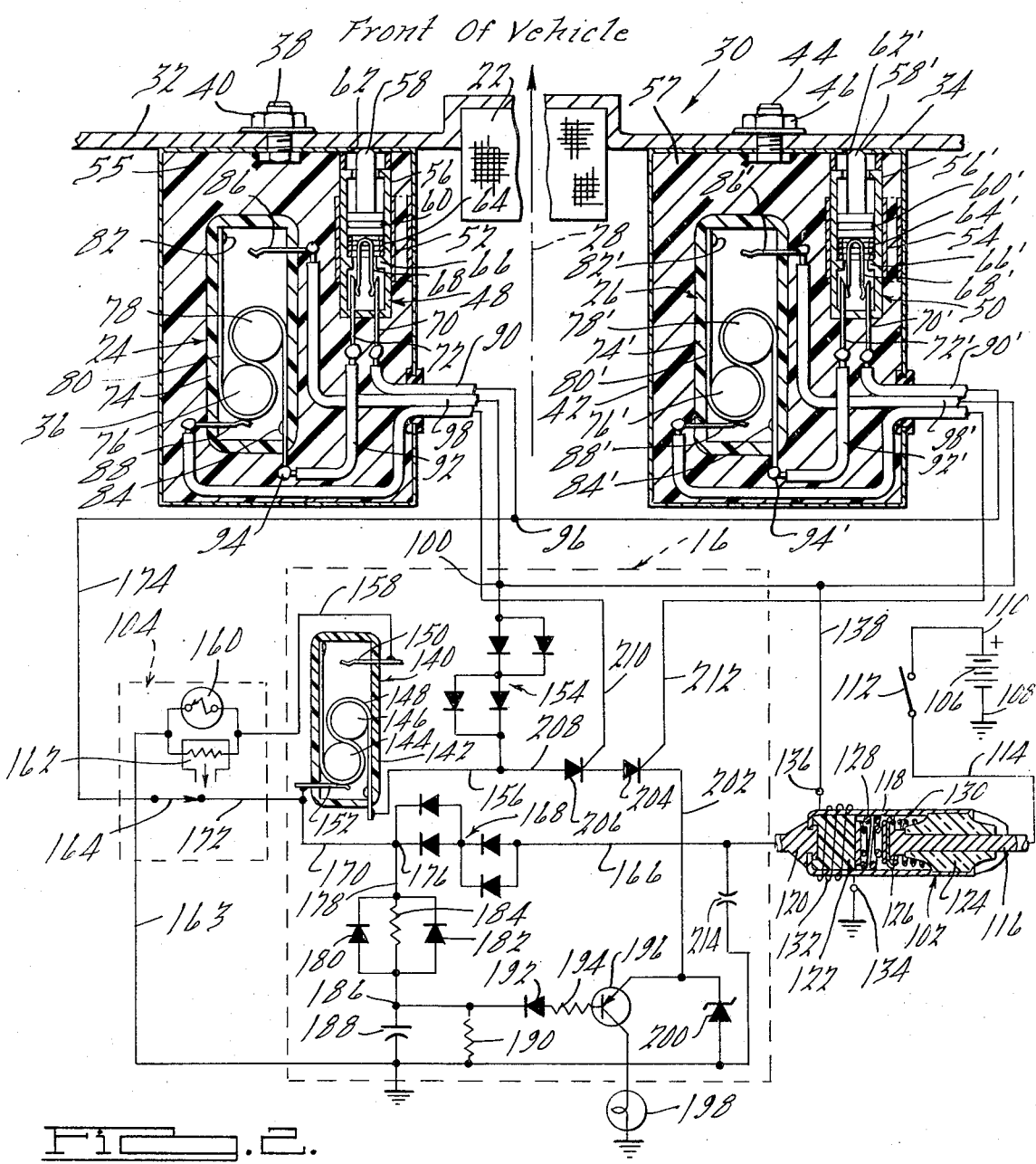
FIG. 2 is an electrical schematic diagram of apparatus for controlling the inflation of an inflatable safety device of a motor vehicle and contains sectional plan views of various switching devices used to sense a vehicle crash.

With reference to FIG. 2, there is shown a sectional plan view and schematic electrical diagram of apparatus for controlling the inflation of an inflatable safety device. In this plan view, the longitudinal centerline of the vehicle 10 is indicated by the numeral 28. The arrow at the upward end of the centerline 28 points in the direction of the front of the vehicle 10. The control apparatus is generally designated by the numeral 30 and the vehicle's radiator 22 is shown to have a support structure 32 on the left-hand side of the longitudinal centerline 28 and a support structure 34 on the right-hand side of the longitudinal centerline 28. The control apparatus 30 includes an acceleration-responsive switch 24 that is located within a housing 36 which, in turn, is attached to the left-hand radiator support structure 32 by any suitable means, such as a threaded stud 38 welded to the housing 36 and secured to the radiator support structure 32 with a nut and washer 40. In a similar manner, the acceleration-responsive switch 26 is contained within a housing 42 that is secured to the right-hand radiator support structure 34 with a threaded stud 44 and nut and washer 46. A mounting switch 48 is located within the housing 36, and a mounting switch 50 is located within the housing 42. The mounting switches 48 and 50 are supported within their respective housings by brackets 52 and 54. The housings 36 and 42 are filled with potting material 55 and 57, such as epoxy or polyurethane resin, to maintain the components within in fixed position and to prevent damage to them from corrosion, etc.

The mounting switch 48 comprises a body 56 having a cylindrical opening within it in which a plunger 58 moves. The plunger 58 is made from a nonconductive material and has an "O" ring 60 that forms a seal between it and the interior cylindrical wall of the body 56. The plunger 58 extends through an opening 62 in the housing 36 and engages the radiator support structure 32. A spring 64 is positioned against a land 66 in the body 56 and against the plunger 58 to urge the plunger in a direction toward the radiator support structure 32.

The plunger 58 carries a U-shaped electrical contact 68 used to complete an electrical circuit between a first electrical terminal 70 and a second electrical terminal 72 which extend through the body 56. The electrical circuit between the first terminal 70 and the second terminal 72 of the mounting switch is completed when the housing 36 is firmly secured to the radiator support structure 32. Should the housing 36 become loose and separate from the radiator support structure, then the spring 64 urges the plunger 58 in an upward direction as viewed in FIG. 2 thereby to cause the contact 68 to open the circuit between the terminals 70 and 72. As will become more evident as the description proceeds, this operation of the mounting switch 48 prevents the acceleration-responsive switch 24 from causing the actuation of the inflatable safety device should the housing 36 in which the switch 24 is mounted become loose or separated from the structure to which it is attached. The mounting switch 50 on the right-hand side of the longitudinal centerline of the vehicle is identical to the mounting switch 48 and its various parts have been assigned corresponding primed numerals.

The acceleration-responsive switch 24 is mounted in fixed position within the housing 36. This switch is of the roller-band type and comprises a body portion or guideway 74, made from a suitable nonconductive material, such as glass or plastic, in which a pair of rollers 76 and 78 move back and forth in the longitudinal direction of the vehicle 10. A conductive band 80 is attached to the guideway 74 at points 82 and 84. The rollers 76 and 78 engage the conductive band 80, which loops around both of them. An electrical pole 86 extends within the interior portion of the guideway 74 at one end thereof and, similarly, another electrical pole 88 extends within the guideway 74 at the other end thereof.

The rollers 76 and 78 and the conductive band 80 are illustrated in their normal positions wherein the conductive band 80 is in electrical contact with the electrical pole 88. The conductive band 80 has a spring force biasing it into contact with the electrical pole 88. Acceleration forces having vector components directed toward the front of the vehicle and acting upon the acceleration-responsive switch 24 tend to cause the rollers 76 and 78 to move in the longitudinal direction of the vehicle and toward its front portion. The response characteristics of the rollers 76 and 78 and of the conductive band 80 are determined by the masses of the rollers, by the spring rate of the conductive band 80, by friction forces within the guideway 74, and by the amount of damping of their movement, such as may be provided by a viscous fluid contained within the guideway. Upon the occurrence of an acceleration impulse, such as may occur during a vehicle crash, to the acceleration-responsive switch 24, the rollers 76 and 78 cause the conductive band 80 to move into electrical contact with the electrical pole 86. This is the acceleration-responsive condition of the switch 24, and whether or not this responsive condition occurs is dependent, in a predetermined manner, upon the characteristics of the acceleration impulse applied to the switch 24. Preferably, the conductive band 80 will make momentary contact with the electrical pole 86 in a predetermined manner dependent upon both the magnitude of the acceleration impulse and on its duration. For example, the conductive band may contact the electrical pole 86 both upon the occurrence of a large magnitude, short duration acceleration impulse and upon the occurrence of a much larger magnitude but longer duration acceleration impulse. The acceleration-responsive switch 26 is identical to the switch 24 and its various parts have been assigned corresponding primed numerals.

Acceleration-responsive or inertial roller-band switches are well known in the art. The following U.S. patents granted to D. F. Wilkes described roller-band devices; U.S. Pat. No. 3,452,175 issued June 24, 1969; U.S. PAT. No. 3,452,309 issued June 24, 1969; and U.S. PAT. No. 3,471,668 issued Oct. 7, 1969.

A single roller-band switch may also be used. A device of this kind is described in U.S. Pat. No. 3,488,098 issued Jan. 6, 1970 to B. J. Sobczak. Roller-band switches are commercially available from Technar, Inc., of Arcadia, California. Other acceleration-responsive or inertia switches may be used in the practice of the present invention.

The mounting switch 48 has its electrical terminals connected in series with the acceleration-responsive switch 24. Thus, a lead 90 is connected to the first electrical terminal 70 of the mounting switch and a lead 92 connects its second electrical terminal 72 to the conductive band 80 of switch 24 at a junction 94. The mounting switch 50 and acceleration-responsive switch 26 on the right-hand side of the longitudinal centerline 28 of the vehicle are series-connected in a similar manner. The lead 90 of mounting switch 48 is connected to the lead 90' of mounting switch 50 at a junction 96. Also, the electrical pole 86 of the acceleration-responsive switch 24 is connected to the corresponding electrical pole 86' of the acceleration-responsive switch 26 through electrical lead wires 98 and 98' forming a junction at point 100. Thus, the series combination of the mounting switch 48 and acceleration-responsive switch 24 is connected in parallel with the series combination of the mounting switch 50 and the acceleration-responsive switch 26.

The apparatus 30 for controlling the inflation of an inflatable safety device includes diagnostic circuitry 16 contained within the indicated broken lines, a thermal cutoff device 102, and electrically actuated means 104 for causing the inflation of the inflatable safety device. Also, the motor vehicle 10 has a source of electrical energy 106 having its negative terminal 108 connected to ground and having its positive terminal 110 connected to a conventional vehicle ignition switch 112.

A lead 114 connects the source of electrical energy, through the ignition switch 112, to a first terminal 116 of the thermal cut-off device 102. The thermal cut-off device 102 includes a casing 118 made from a conductive material, a second conductive terminal 120, and a fusible element 122. The first electrical terminal 116 is positioned within a ceramic bushing 124 and a conductive disc 126 is in electrical contact with the first terminal 116 and with the casing 118. A compression spring 128 urges the disc 126 into contact with the first terminal 116 and a trip spring 130 urges the disc 126 in the opposite direction.

The terminal cut-off device 102 is shown in its normal condition wherein it is conductive between its first terminal 116 and its second terminal 120 through the electrical path including the disc 126 and the casing 118. When the fusible element 122 melts, the trip spring 130 forces the disc 126 out of electrical contact with the first terminal 116 and renders the path between the first terminal 116 and the second terminal 120 nonconductive. The thermal cut-off device 102 is commercially available from Micro Devices Corporation of Dayton, Ohio.

A resistance wire 132 is coiled around the casing 118 of the thermal cut-off device 102 in the location of the fusible element 122. The resistance wire 132 has one of its terminals connected to ground at 134. It other terminal 136 is connected by a lead wire 138 to the junction 100 formed between the electrical poles 86 and 86', respectively, of the acceleration-responsive switches 24 and 26.

The diagnostic circuitry 16 includes a third acceleration-responsive switch 140. The switch 140 is generally similar in design to the switches 24 and 26 in that it includes a body portion or guideway 142, rollers 144 and 146, a conductive band 148 affixed in two locations to the guideway, an electrical pole 150 and another electrical pole 152 with which the conductive band 148 is in electrical contact under normal conditions. The switch 140 is responsive, such that its conductive band 148 is in electrical contact with the electrical pole 150, in a predetermined manner to acceleration impulses of a magnitude less than those to which the switches 24 and 26 are responsive.

The junction 100 formed between the electrical poles 86 and 86', respectively, of the switches 24 and 26 is connected through a redundant diode assembly 154 to an electrical lead 156 which, in turn, is connected to the conductive band 148 of the switch 140. The electrical pole 150 of the switch 140 is connected by a lead 158 to the parallel combination of an explosive squib 160 and an ignitor squib 162; a lead 163 connects the other side of the squibs 160 and 162 to ground. Thus, the acceleration-responsive switch 140 is connected in series with the parallel-connected acceleration-responsive switches 24 and 26. Also, this switch combination is connected to the electrically actuated means 104 for causing inflation of the inflatable safety device.

The inflation causing means 104 is shown as comprising the explosive squib 160 connected in parallel with the ignitor squib 162. In actual practice, only one or more of either device may be required depending upon the means selected to obtain inflation of the inflatable safety device. If a gas is to be stored within a cylinder or the like, a pressure switch 164 may be used to indicate, in its normally closed condition as shown, that there is gas within the storage container sufficient to inflate the inflatable safety device.

The second terminal 120 of the thermal cut-off device 102 is connected, via a lead 166, a redundant diode assembly 168, and a lead 170, to the electrical pole 152 of the switch 140 and by a lead 172 to the pressure switch 164. The other side of the pressure switch 164 is connected by a lead 174 to the common junction 96 formed between the first terminals 70 and 70', respectively, of the mounting switches 48 and 50.

The cathode side 176 of the redundant diode assembly 168 is connected by a lead 178 to the parallel combination of diodes 180 and 182 and a resistor 184. The anodes of the diodes 180 and 182 and one terminal of the resistor 184 is connected at a junction 186 to one terminal of a capacitor 188, the other terminal of which is connected to ground.

A resistor 190 has one of its terminals connected to the ground and has its other terminal connected to the junction 186 and to the cathode of a diode 192. The anode of the diode 192 is connected through a resistor 194 to the base of a transistor 196. The collector of the transistor 196 is connected through an indicating light 198 to ground. The emitter of the transistor 196 is connected to the cathode of a zener diode 200 the anode of which is connected to ground. The emitter of the transistor 196 is also connected by a lead 202 to the cathode of a controlled rectifier 204 the anode of which is connected to the cathode of a second controlled rectifier 206. The anode of the controlled rectifier 206 is connected by a lead 208 to the junction formed between the redundant diode assembly 154 and the lead 156. The gate electrode of controlled rectifier 206 is connected by a lead 210 to the electrical pole 84 of the acceleration-responsive switch 24. Similarly, the gate electrode of the controlled rectifier 204 is connected by a lead 212 to the electrical pole 84' of the acceleration-responsive switch 26.

A sphere gap 214 connected between the supply lead 166 and ground is used to provide overvoltage protection for the circuit.

The operation of the apparatus of FIG. 2 will now be described with the assumption that the ignition switch 112 is in its open condition and that all of the other switches are in their normal conditions, that is, the conditions shown in FIG. 2. When the ignition switch 112 is closed, conventional current flows from the source of electrical energy 106, through the lead 114 and thermal cut-off device 102, to the lead 166. From this point, current flows through the redundant diode assembly 168 and through the lead 178 and resistor 184 into the capacitor 188 connected to ground. The diodes 180 and 182 are reverse-biased. Current also flows from the junction 176, through the lead 170, to the electrical pole 152 of the switch 140. A positive potential is applied to the lead 156 as a result of the electrical contact between the electrical pole 152 and the conductive band 148 of the switch 140. This potential is applied by the lead 208 to the anode of the controlled rectifier 206. Redundant diode assembly 154 blocks current flow through it from the lead 208.

Electrical current also flows through the lead 172 and the normally closed pressure switch 164 into the lead 174 connected to the junction 96. At the junction 96, the current path divides and a portion of it flows through the lead 90 and the closed circuit between the terminals 70 and 72 of the mounting switch 48 into the lead 92 connected at the junction 94 to the conductive band 80 of switch 24. Current flowing through the conductive band 80 is conveyed via the electrical pole 88 to the lead 210 connected to the gate electrode of the controlled rectifier 206. This causes the controlled rectifier 206 to become conductive applying a positive voltage to the anode of the controlled rectifier 204.

The current flowing from the junction 96 into the lead 90' flows through the closed circuit formed between the electrical terminals 70' and 72' of the mounting switch 50 and then through the conductive band 80' and electrical pole 88' of the switch 26. This current then flows through the lead 212 connected to the gate electrode of the controlled rectifier 204 rendering it conductive.

When the controlled rectifiers 206 and 204 are rendered conductive, a positive potential is applied to the emitter of the transistor 196 and current flows through the lead 202, across the emitter-base juncture of the transistor 196, through the resistor 194 and the forward-biased diode 192 and into the capacitor 188. Current also flows through the emitter-collector output circuit of the transistor 196 and through the indicating light 198 to ground. Illumination of the light 198 indicates that the capacitor 188 is being charged, that the pressure switch 164 is closed, that the electrical lead 174 is supplying current to the mounting switches 48 and 50 and to the conductive bands 80 and 80' of the acceleration-responsive switches 24 and 26, that the acceleration-responsive switch 140 is conductive through its conductive band 148, and that the thermal cut-off device 102 is conductive between its electrical terminals 116 and 120. After the capacitor 188 has become fully charged, the indicating light 198 is extinguished.

Now let it be assumed that the vehicle 10 is moving along a bumpy road surface and traveling up and down hills. In such case, it has been found that the acceleration impulses to which the switches 24 and 26 are subjected are substantially damped out if the switches are located on the radiator or its support structure. However, the acceleration-responsive switch 140 may from time to time have its conductive band 148 make momentary contact with its electrical pole 150, particularly, when the vehicle is traveling downhill or over a bumpy road surface. This responsive condition of the switch 140 will not, however, cause the deployment of the inflatable safety device because the switch 140 is connected in series with the parallel-connected switches 24 and 26.

Let it be assumed now that the vehicle 10 is involved in a frontal crash the impact energy of which is directed along a line, for example, at an angle of 30° left of the longitudinal centerline 28 of the vehicle. Further, let it be supposed that this impact is sufficient to generate acceleration impulses acting upon the switch 24 of a magnitude and duration sufficient to cause the rollers 76 and 78 to move the conductive band 80 into electrical contact with the electrical pole 86. Under these circumstances, the conductive band 148 of the acceleration-responsive switch 140 moves into contact with the electrical pole 150, this switch 140 being responsive to acceleration impulses of a magnitude and duration less than those to which the switch 24 is responsive. In such case, current flows from the source of electrical energy 106, through the thermal cut-off device 102 and the lead 166, and into the redundant diode assembly 168. The current then flows through the lead 170, the lead 172, the pressure switch 164, and the lead 174 to the junction 96. At the junction 96, the current flows through the lead 90 into the mounting switch 48. Current continues from the mounting switch 48 into the lead 92 and the conductive band 80 of the switch 24 to the electrical pole 86 thereof. From the electrical pole 86, the current flows through the lead 98 to the junction 100 and into the redundant diode assembly 154. The current then flows from the redundant diode assembly 154 into the lead 156 and from there through the conductive band 148 of the switch 140 to its electrical pole 150. From the electrical pole 150, the current flows through the lead 158 to the explosive and ignitor squibs 160 and 162 and through the lead 163 to ground. The electrical actuation of the squib 160 and 162 causes a gas to be released and/or generated to inflate the inflatable safety device. Thus, the occupants of the passenger compartment 12 of the vehicle 10 are restrained during the crash.

Under the above-described crash circumstances, whether or not the acceleration-responsive switch 26 attained its acceleration-responsive condition is immaterial since this switch is connected in parallel with the switch 24. Of course, the inflatable safety device would also be deployed if only switches 26 and 140 were to be actuated.

It should be noted that if the housing 36 were not firmly secured to the radiator support structure 32, then the plunger 58 of the mounting switch 48 would have moved forward to open the circuit between the electrical terminals 70 and 72 thus preventing actuation of the squibs 160 and 162. However, if such a condition exists, the transistor 196 will not be rendered conductive when the ignition switch 112 is initially closed and indicating light 198 will not be illuminated, thus, indicating a system malfunction.

It should also be noted that in the event the source of electrical energy 106 should become disconnected from the remainder of the circuit or short-circuited, then electrical energy to energize the squibs 160 and 162 is obtained from the capacitor 188. In such case, electrical current flows from the capacitor junction 186, through the foreward-biased diodes 180 and 182, to the junction 176 and the lead 170. From there the current flow is as described above. If the source of electrical energy 106 is short-circuited, the capacitor current is prevented from flowing through this short-circuit by the redundant assembly 168.

Let it be supposed now that the vehicle 10 is standing still and that the conductive band 80 comes into electrical contact with electrical pole 86, such as might occur upon the inadvertent application of an impact to the radiator support structure 32 or other vehicle portion, or that a short-circuit of the lead wires 92 and 98 occurs. In such case, the switch 140 remains in the condition shown in FIG. 2 and the inflatable safety device is not deployed. Should the conductive band 80 remain in electrical contact with the electrical pole 86 or should the short-circuit continue, then current from the source of electrical energy 106 will flow through the mounting switch 48 and the switch 24 to the lead wire 98. This current then flows to the junction 100 and, through the lead wire 138, to the terminal 136 of the resistance wire 132 coiled around the terminal cut-off device 102 and to ground at 134. The current flow through the resistance wire 132 produces heat sufficient to melt the fusible element 122. This disconnects the source of electrical energy 106 from the control apparatus 30. Of course, once this disconnection results, the indicating light 198 cannot be illuminated upon closure of the ignition switch 112. Preferably, the fusible element 122 melts within 5 to 45 seconds after the initiation of current flow in the resistance wire 132.

Figure 3:
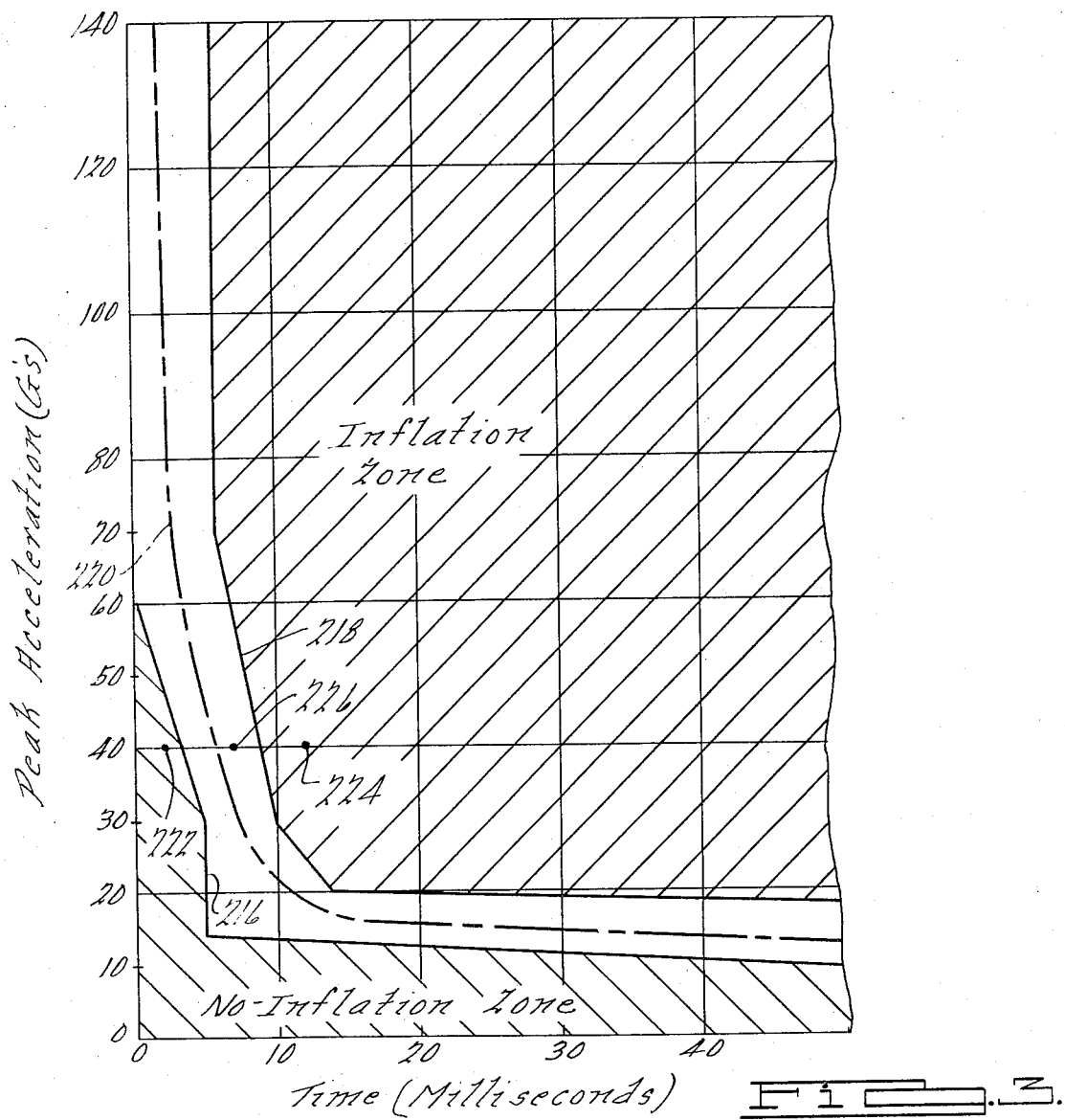
FIG. 3 is a graph of peak acceleration in G's vs. time in milliseconds illustrative of the desired response characteristics for an acceleration-responsive switch.

With reference now to FIG. 3, there is shown a graph of time, in milliseconds, plotted on the abscissa versus peak acceleration in G's where G is the acceleration of gravity, plotted on the ordinate. The graph of FIG. 3 depicts the predetermined manner in which the switches 24 and 26 should respond to acceleration impulses acting upon them. The graph applies to 1973 Ford model automobiles wherein the switches 24 and 26 are attached to the radiator support structure of the vehicle at a point thereon above the horizontal centerline of the radiator. For other vehicle designs, it may be necessary to modify the response curves for the acceleration-responsive switches 24 and 26.

In the graph of FIG. 3, the area below the curve 216 defines a no-inflation zone, that is, a zone in which the switches 24 and 26 will not be actuated to cause inflation of the inflatable safety device. The area of the graph above the curve 218 defines an inflation zone, that is, a zone in which the switches 24 and 26 will assume their acceleration-responsive condition wherein the necessary electrical contact is made to cause inflation of the inflatable safety device. The curve 220 lying between these inflation and no-inflation zones defines the ideal response of the switches 24 and 26. The curve 220 lies within a tolerance band for the switches 24 and 26 wherein acceleration impulses may or may not cause the inflation of the inflatable safety device.

Let it be assumed that the switches 24 and 26 are subjected to an acceleration impulse having a peak value of 40 G's and a duration of two milliseconds. From the graph, it may be seen that this defines a point 222 lying within the no-inflation zone and, thus, the inflatable safety device is not deployed. However, were the 40 G acceleration impulse to have a duration of 11 milliseconds, this acceleration impulse being defined by a point 224, then the inflatable safety device would be deployed. If the 40 G acceleration impulse were to have a duration of 7 milliseconds, defining the point 226, then deployment of the inflatable safety device may or may not take place, depending upon the response characteristics of the particular switch involved, because the point 226 is located within the tolerance band for the acceleration-responsive switches.

Generally, from FIG. 3 it may be seen that high peak acceleration impulses having short duration will cause deployment of the inflatable safety device and that much lower peak acceleration impulses having much longer durations will also cause deployment of the inflatable safety device.

In the adaptation of the present invention to various vehicle designs and types, graphs similar to that illustrated in FIG. 3 may be used to specify the acceleration response characteristics of the switches 24 and 26. A similar graph may also be used to specify the requirements for the acceleration-responsive switch 140, although such a specification for the switch 140 is believed to be unnecessary.

In FIG. 3, the no-inflation zone defines all of the acceleration impulses normally experienced by the switches 24 and 26 positioned above on a 1973 Ford model vehicle when the vehicle is undergoing use in both mild and severe conditions.

Figure 4:
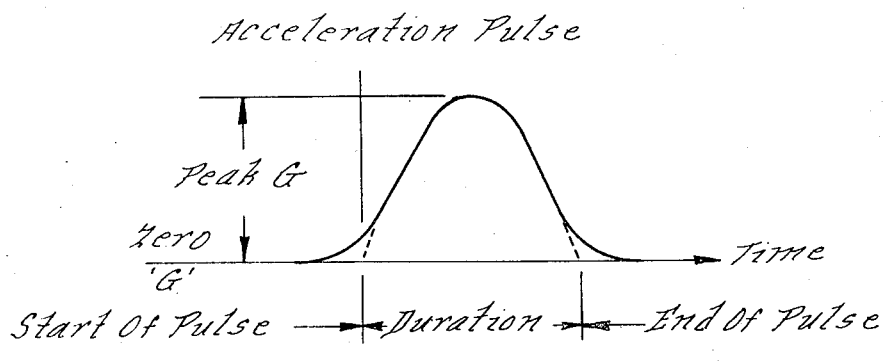
FIG. 4 is a graph illustrating an acceleration pulse that may be used, at least in part, to specify the response characteristics of acceleration-responsive switches.

In addition to the specification of the predetermined acceleration-response characteristics of the switches 24 and 26 with the use of a graph such as shown in FIG. 3, the switches 24 and 26 and also the switch 140 may be specified in terms of their predetermined response to a particular acceleration pulse. FIG. 4 illustrates a test pulse which may be used to specify the response characteristics of an acceleration-responsive switch.

The acceleration pulse of FIG. 4 has an approximate haversine wave shape, has a peak acceleration defined as indicated, and its start, duration and end are as shown. In response to an acceleration pulse of a character illustrated in FIG. 4 having a peak acceleration of 23 G's and a duration of 16 milliseconds, the switches 24 and 26 should have their normally open contacts closed within 20 milliseconds from the start of the pulse and these contacts should remain closed for a minimum of 15 milliseconds.

For the switch 140, it has been found that the normally open contacts of this switch should make contact when subjected to a constant acceleration of 0.9 G's or greater directed along the longitudinal axis of the switch and that the normally open contacts should not close when the switch is subjected to a constant acceleration of 0.7 G's or less directed along its longitudinal axis. Also, when the switch 140 is subjected to an acceleration pulse of the character illustrated in FIG. 4 having a peak acceleration of 23 G's and a duration of 16 milliseconds, the normally closed contacts should close within 20 milliseconds and remain closed for a minimum of 50 milliseconds.

From the above, it is apparent that the predetermined acceleration to which the switch 140 is responsive is considerably less than the predetermined acceleration to which the switches 24 and 26 are responsive.

What is claimed and desired to be protected by Letters Patent is:

1. In a motor vehicle having a passenger compartment, an inflatable safety device positioned within said passenger compartment for restraining a vehicle occupant during a crash of said vehicle, a radiator positioned forward of said passenger compartment and a source of electrical energy; apparatus for controlling the inflation of said inflatable safety device, said apparatus comprising: electrically actuated means for causing the inflation of said inflatable safety device, said inflation causing means being connected to one terminal of said source of electrical energy; a first switch attached to said radiator or its support structure, said first switch being responsive to a predetermined acceleration; a second switch connected in series with said first switch, said second switch being located in said passenger compartment and being responsive to a predetermined acceleration less than that to which said first switch is responsive; and a thermal cut-off device having a first and second terminal, said first terminal of said thermal cut-off device being connected to the other terminal of said source of electrical energy, said second terminal of said thermal cut-off device being connected through said first and second switches to said inflation causing means, said thermal cut-off device having a fusible element therein and being normally conductive between its first and second terminals, said fusible element when melted rendering said thermal cut-off device nonconductive between its first and second terminals; and a resistance wire coiled around said thermal cut-off device, said resistance wire being connected to said source of electrical energy and to said first switch to supply current to said resistance wire when said first switch is in its accelertion-responsive condition.

2. In a motor vehicle having a passenger compartment, an inflatable safety device positioned within said passenger compartment for restraining a vehicle occupant during a crash of said vehicle, a radiator positioned forward of said passenger compartment and a source of electrical energy; apparatus for controlling the inflation of said inflatable safety device, said apparatus comprising: electrically actuated means for causing the inflation for said inflatable safety device, said inflation causing means being connected to one terminal of said source of electrical energy; a first housing attached to said radiator or its support structure at a location thereon on one side of the longitudinal centerline of said vehicle; a second housing attached to said radiator or its support structure at a location thereon on the other side of the longitudinal centerline of said vehicle; first mounting switch means for detecting an insecure attachment of said first housing to said radiator or its support structure; second mounting switch means for detecting an insecure attachment of said second housing to said radiator or its support structure; first acceleration-responsive switch means for sensing a crash of said vehicle, said first acceleration-responsive switch means being connected in series with said first mounting switch means and being located within said first housing; second acceleration-responsive switch means for sensing a crash of said vehicle, said second acceleration-responsive switch means being connected in series with said second mounting switch means and being located within said second housing; third acceleration-responsive switch means for sensing a crash of said vehicle, said third acceleration-responsive switch means being positioned within said vehicle passenger compartment and being responsive to a predetermined acceleration less than that to which said first and second acceleration-responsive switch means are responsive, said first and second acceleration-responsive switch means being connected in parallel and said parallel-connected first and second acceleration-responsive switch means being connected in series with said third acceleration-responsive switch means; and a thermal cut-off device connected to the other terminal of said source of electrical energy and connected through said first, second and third acceleration-responsive switch means to said inflation causing means.

3. In a motor vehicle having a passenger compartment, an inflatable safety device positioned within said passenger compartment for restraining a vehicle occupant during a crash of said vehicle, a radiator positioned forward of said passenger compartment and a source of electrical energy; apparatus for controlling the inflation of said inflatable safety device, said apparatus comprising: electrically actuated means for causing the inflation of said inflatable safety device, said inflation causing means being connected to one terminal of said source of electrical energy; a first housing attached to said radiator or its support structure at a location thereon on one side of the longitudinal centerline of said vehicle, said first housing having an opening in it; a second housing attached to said radiator or its support structure at a location thereon on the other side of the longitudinal centerline of said vehicle, said second housing having an opening in it; first and second mounting switches, said first mounting switch being located within said first housing and said second mounting switch being located within said second housing, each of said mounting switches having a body attached to the housing in which it is located, a plunger movable within said body and extending through the opening in the housing, means for urging said plunger toward said radiator or its support structure, first and second electrical terminals, and contact means carried by said plunger for completing an electrical circuit between said first and second mounting switch terminals when the housing is secured to said radiator or its support structure, said first terminal of said first mounting switch being electrically connected to said first terminal of said second mounting switch; first and second roller-band switches, said first roller-band switch being mounted in fixed position within said first housing and said second roller-band switch being mounted in fixed position within said second housing, each of said roller-band switches having an electrical pole and having at least one roller and a conductive band engaging said roller, said conductive band being normally out of electrical contact with said electrical pole, said roller and conductive band being movable in the longitudinal direction of said vehicle in response to a predetermined acceleration, said conductive band making electrical contact with said electrical pole upon the occurrence of said predetermined acceleration, said electrical pole of said first roller-band switch being electrically connected to said electrical pole of said second roller-band switch, said conductive band of said first roller-band switch being electrically connected to said second terminal of said first mounting switch, and said conductive band of said second roller-band switch being electrically connected to said second terminal of said second mounting switch; a third roller-band switch mounted in fixed position within said vehicle passenger compartment, said third roller-band switch having an electrical pole and having at least one roller and a conductive band engaging said roller, said conductive band being normally out of electrical contact with said third roller-band switch electrical pole, said roller and said conductive band of said third roller-band switch being movable in the longitudinal direction of said vehicle in response to a predetermined acceleration less than the predetermined accelerations to which said first and second roller-band switches are responsive, said conductive band of said third roller-band switch making electrical contact with said third roller-band switch electrical pole upon the occurrence of said predetermined acceleration to which it is responsive, said third roller-band switch electrical pole being electrically connected to said inflation causing means, said electrical poles of said first and second roller-band switches being electrically connected with said conductive band of said third roller-band switch; a thermal cut-off device having a first terminal connected to the other terminal of said source of electrical energy and a second terminal connected to said first terminals of said first and second mounting switches, said thermal cut-off switch normally being conductive between its first and second terminals and having thermally responsive means for rendering said thermal cut-off device nonconductive between its first and second terminals; and a resistance wire coiled around said thermal cut-off device, said resistance wire being connected at one of its ends to said one terminal of said source of electrical energy and at its other end to said electrical poles of said first and second roller-band switches.

4. In a motor vehicle having a passenger compartment, an inflatable safety device positioned within said passenger compartment for restraining a vehicle occupant during a crash of said vehicle, a radiator positioned forward of said passenger compartment and a source of electrical energy; apparatus for controlling the inflation of said inflatable safety device, said apparatus comprising: electrically actuated means for causing the inflation of said inflatable safety device, said inflation causing means being connected to one terminal of said source of electrical energy; a first switch attached to said radiator or its support structure at a location thereon on one side of the longitudinal centerline of said vehicle, said first switch being responsive to a predetermined acceleration; a second switch attached to said radiator or its support structure at a location thereon on the other side of the longitudinal centerline of said vehicle, said second switch being responsive to aa predetermined acceleration; a third switch mounted in the passenger compartment of said vehicle, said third switch being responsive to a predetermined acceleration less than the predetermined accelerations to which said first and second switches are responsive; said other terminal of said source of electrical energy being connected through said switches to said inflation causing means, said inflatable safety device being inflated by the electrical actuation of said inflation causing means, said actuation resulting from the simultaneous acceleration responses of said first and third switches or of said second and third switches or of all three of said switches.

5. Apparatus in accordance with claim 4, wherein said first and second switches are connected in parallel and wherein said parallel-connected first and second switches are connected in series with said third switch.

6. Apparatus in accordance with claim 4, wherein said apparatus further includes a thermal cut-off device interconnected between said other terminal of said source of electrical energy and said first, second and third switches, said thermal cut-off device containing a fusible element for disconnecting said source of electrical energy from said apparatus, and means for melting said fusible element when either of said first or second switches has been in its acceleration-responsive condition for a predetermined length of time.

7. Apparatus in accordance with claim 4, said apparatus further comprising switching means for detecting an insecure attachment of said first and second acceleration-responsive switches to said radiator or its support structure.

* * * * *